United States Patent

Van Zanten et al.

[11] Patent Number: 5,129,281
[45] Date of Patent: Jul. 14, 1992

[54] CABLE ASSEMBLY FOR HEATER AIR CONTROL

[75] Inventors: David A. Van Zanten, Clawson; Norman B. Lichtenberg, Troy, both of Mich.

[73] Assignee: Nagle Industries, Inc., Clawson, Mich.

[21] Appl. No.: 461,601

[22] Filed: Jan. 5, 1990

[51] Int. Cl.⁵ .................................. F16C 1/22
[52] U.S. Cl. .................. 74/501.5 R; 74/506; 188/196 B; 192/111 A
[58] Field of Search .......... 74/501.5 R, 501.6, 502.5, 74/502.6, 506, 89.22; 192/111 A; 188/196 B, 196 D, 196 R, 2 D

[56] References Cited

U.S. PATENT DOCUMENTS

| | | | |
|---|---|---|---|
| 732,057 | 6/1903 | Dring | 74/502.2 |
| 1,740,909 | 12/1929 | Shaw | 74/96 |
| 1,877,385 | 9/1932 | Casaletto | 188/196 B |
| 2,263,662 | 11/1941 | Waper | 74/96 |
| 2,770,454 | 11/1956 | Turtle | 74/506 |
| 3,088,449 | 5/1963 | Hockaday et al. | 74/501.6 |
| 3,363,881 | 1/1968 | Kobelt | 74/96 |
| 3,759,352 | 9/1973 | Toplis | 74/501.5 R |
| 3,943,794 | 3/1976 | Shimada | 74/501.5 R |
| 4,041,797 | 8/1977 | Mito | 74/500.5 |
| 4,400,993 | 8/1983 | Kobayashi et al. | 74/501.5 R |
| 4,529,155 | 7/1985 | Bramwell et al. | 74/501.5 |
| 4,691,584 | 9/1987 | Takaishi et al. | 74/501.6 |
| 4,694,706 | 9/1987 | Lichtenberg et al. | 74/502 |
| 4,840,081 | 6/1989 | Nagano | 74/506 |
| 4,854,185 | 8/1989 | Lichtenberg et al. | 74/501.5 R |
| 4,936,159 | 6/1990 | Kallio | 74/501.5 R |

FOREIGN PATENT DOCUMENTS

| | | | |
|---|---|---|---|
| 52-41788 | 3/1977 | Japan | 74/501.5 R |
| 54-31143 | 10/1979 | Japan | 74/501.5 R |

*Primary Examiner*—Leslie A. Braun
*Assistant Examiner*—Winnie Yip
*Attorney, Agent, or Firm*—Dinnin & Dunn

[57] ABSTRACT

A cable assembly for rotating a member in response to a rotating input, including first and second pulley members and a conduit extending longitudinally and interconnecting the first and second pulley members. A pair of spaced strands extend longitudinally through the conduit and at least partially about the first and second pulley members. The first pulley member includes a slack adjustment mechanism for adjusting the slack in the strands.

22 Claims, 3 Drawing Sheets

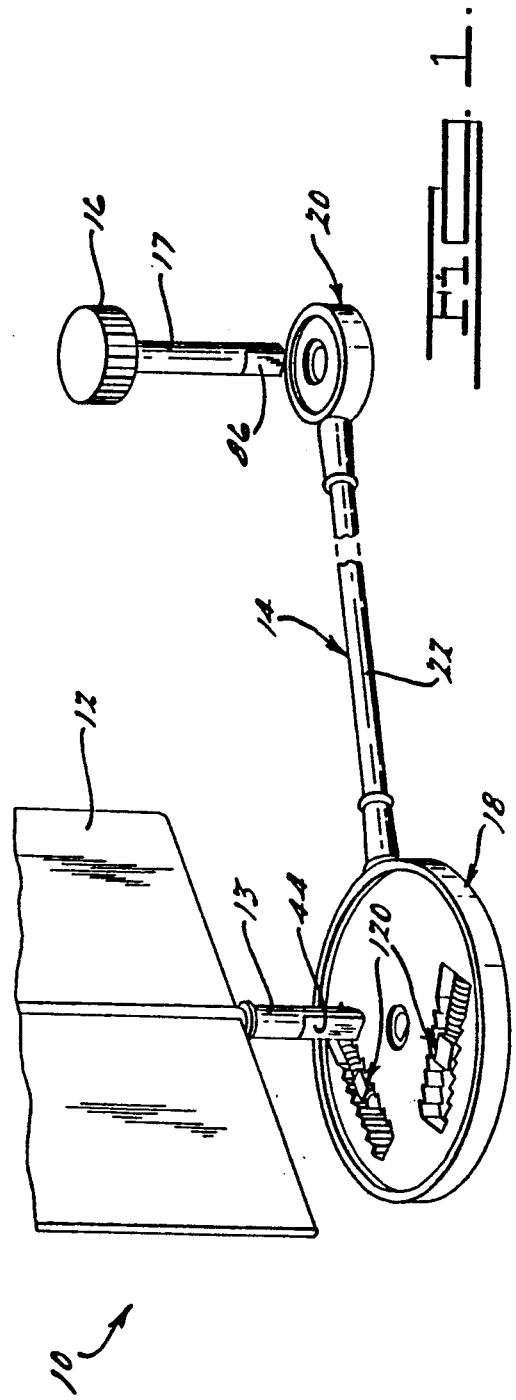
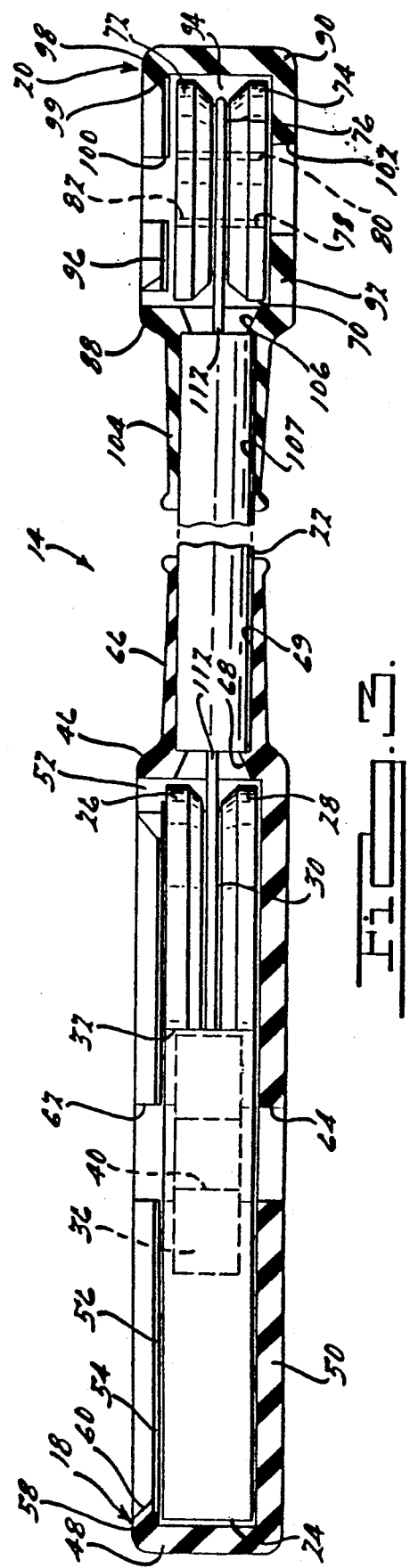

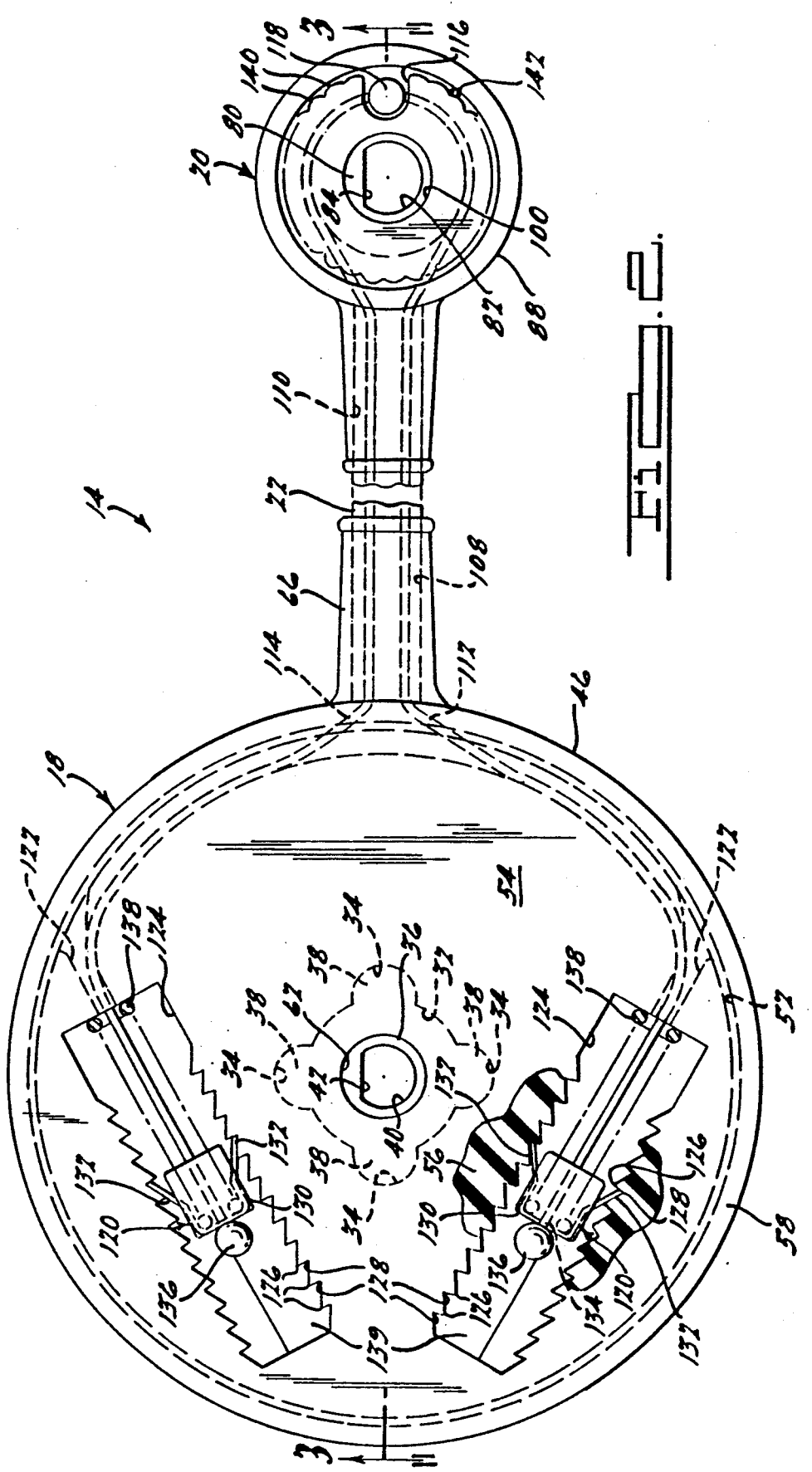

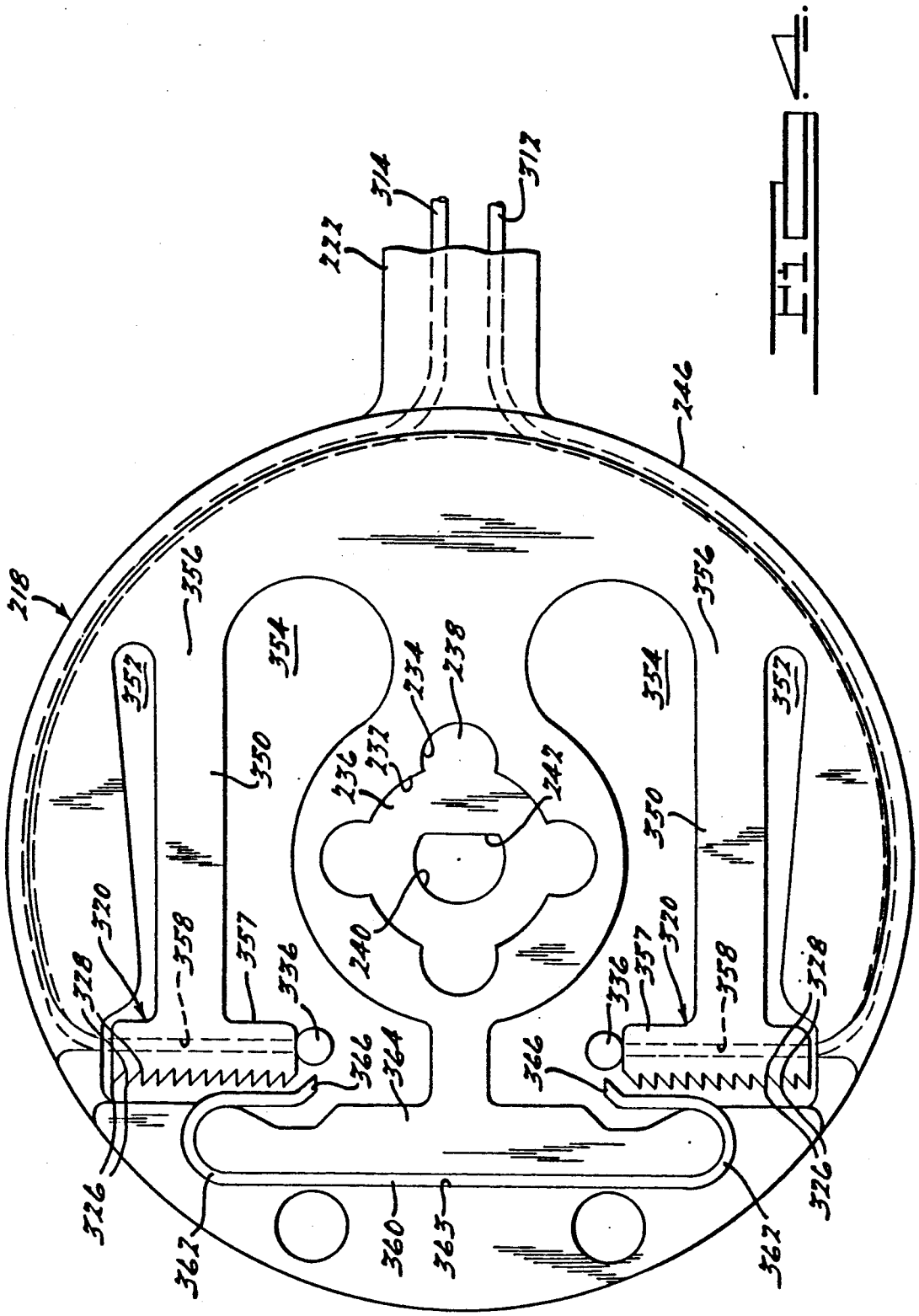

CABLE ASSEMBLY FOR HEATER AIR CONTROL

BACKGROUND OF THE INVENTION

1. Field of the Invention

The present invention relates generally to cables, and more particularly to, a cable assembly for rotating a vane for directing air over an engine of a vehicle to control heater air.

2. Description of Related Art

Previously, a cable assembly such as a vent cable has been used to rotate a vane or flap to direct air over an engine of a vehicle for controlling air for the heater. Typically, these cables have used a single strand of wire in a conduit having an actuating mechanism which moves the strand of wire similar to conventional push-pull devices.

One disadvantage with the above cable assemblies is that the strand of wire is typically in a state of compression when pushed. That is undesired because the strand may bind or buckle. As a result, larger diameter strands of wire have to be used. Another disadvantage is that a push-pull operation is used which may be undesired.

SUMMARY OF THE INVENTION

It is, therefore, an object of the present invention to provide a new and improved cable assembly for heater control.

It is another object of the present invention to provide a cable assembly in which strands of wire are used in a state of tension only.

It is yet another object of the present invention to eliminate the operation of push-pull as used in conventional heater control cables.

To achieve the foregoing objects, the present invention is a cable assembly for rotating a member in response to a rotating input, including first and second pulley means and conduit means extending longitudinally and interconnecting the first and second pulley means. A strand means extends through the conduit means and at least partially about the first and second pulley means. The first pulley means includes slack adjustment means for adjusting the slack in the strand means.

One advantage of the present invention is that smaller diameter strands are used because the strands are used in tension only. Another advantage of the present invention is that the operation of push-pull is eliminated. Yet another advantage of the present invention is that torque and/or angular travel may be amplified or reduced by varying the size of the pulleys. A further advantage of the present invention is that the strands may have the slack taken up in several ways. A still further advantage of the present invention is that the cable assembly may be rotated freely. Yet another advantage of the present invention is that the direction of rotation of the pulleys may be easily changed from end to end.

Other objects, features, and advantages of the present invention will be readily appreciated as the same becomes better understood when viewed in light of the following description and accompanying drawings.

BRIEF DESCRIPTION OF THE DRAWINGS

FIG. 1 is a perspective view of a heater control arrangement incorporating a cable assembly according to the present invention.

FIG. 2 is a plan view of the cable assembly of FIG. 1.

FIG. 3 is a sectional view taken along line 3—3 of FIG. 2.

FIG. 4 is a plan view of an alternate embodiment of the cable assembly of FIG. 1.

DESCRIPTION OF THE PREFERRED EMBODIMENT

Referring to FIG. 1, a heater control arrangement 10 is shown. The heater control arrangement 10 includes a generally planar vane or flap 12 which is operatively connected by a support member 13 to one end of a cable assembly, generally indicated at 14, according to the present invention. The heater control arrangement 10 also includes a knob 16 operatively connected by a shaft member 17 which is connected to the other end of the cable assembly 14. The operation of the heater control arrangement 10 is such that when the knob 16 is rotated, the cable assembly 14 translates this rotational movement to rotate the vane 12 and direct air over an engine (not shown) of a vehicle (not shown) for controlling air for a heater (not shown). A more detailed description of the operation of the heater control arrangement 10 will be subsequently described.

Referring to FIGS. 2 and 3, the cable assembly 14 includes a first or large diameter pulley, generally indicated at 18, and a second or small diameter pulley, generally indicated at 20, interconnected by a longitudinally extending conduit 22. The large and small diameter pulleys 18 and 20 and conduit 22 are made from a plastic material. It should be appreciated that the pulley 18 has a diameter larger or greater than the pulley 20. It should also be appreciated that the diameter of the pulleys 18 and 20 could be equal or reversed.

The large diameter pulley 18 includes a first or large pulley member 24 having a pair of spaced and generally parallel circular flanges 26 and 28 of an enlarged diameter to form a notch or groove 30 therebetween of a smaller diameter. The large pulley member 24 has a generally concentric and circular aperture 32 extending diametrically therethrough. The aperture 32 includes four semi-circular radially extending recesses 34 similar to a "four leaf clover". A bushing 36 is disposed within the aperture 32 and is generally circular in shape. The bushing 36 is made from a metallic material. The bushing 36 includes four corresponding semi-circular and radially extending projections 38 which are adapted to be received or disposed in the recesses 34 of the aperture 32. The bushing 36 includes a generally concentric and circular aperture 40 having a flat 42 extending therethrough. The aperture 40 is adapted to receive a corresponding circular end of the support member 13 having a flat 44 (FIG. 1) to mate with flat 42 such that rotation of the large pulley member 24 and bushing 36 will rotate the support member 13 and vane 12.

The large diameter pulley 18 also includes a generally circular housing 46. The housing 46 has an annular side wall 48 and a generally circular bottom wall 50 which form a cavity 52. The large pulley member 24 is disposed within the cavity 52. A generally circular and planar plate member 54 is disposed adjacent an outer surface 56 of the flange 26 of the large pulley member 24. The plate member 56 and large pulley member 24 are secured in the cavity 52 by a flange 58 at the free end of the side wall 48 which extends radially inwardly and has an inclined or beveled surface 60. It should be appreciated that the large pulley member 24 is sandwiched between the plate member 54 and bottom wall 50 such that the large pulley member 24 is free to rotate within the cavity 52. It should also be appreciated that the bottom wall 50, side wall 48 and flange 58 are preferably integral.

The plate member 54 and bottom wall 50 each include an aperture 62 and 64 extending therethrough and generally concentrically aligned with the aperture 40 of the bushing 36. The housing 46 also includes a generally circular and tubular extension 66 extending radially outwardly from the side wall 48. An aperture 68 extends through the housing 46 and communicates with the cavity 52 and an interior 69 of the tubular extension 66. One end of the conduit 22 is disposed within the interior 69 of the tubular extension 66. It should be appreciated that the conduit 22 is secured within the tubular extension 66.

The small diameter pulley 20 includes a small pulley member 70 having a pair of spaced and generally parallel circular flanges 72 and 74 of an enlarged diameter to form a notch or groove 76 therebetween of a smaller diameter. The small pulley member 70 has a generally concentric and circular aperture 78 extending diametrically therethrough. A bushing 80 is disposed within the aperture 78 and is generally circular in shape. The bushing 80 is made from a metallic material. The bushing 80 includes a generally concentric and circular aperture 82 which has a flat 84 extending therethrough. The aperture 82 is adapted to receive a corresponding circular end of the shaft member 17 having a flat 86 (FIG. 1) to mate with the flat 84 such that rotation of the knob 16 will rotate the bushing 80 and small pulley member 70.

The small pulley member 70 also includes a generally circular housing 88. The housing 88 has an annular side wall 90 and a generally circular bottom wall 92 which form a generally circular cavity 94. The small pulley member 70 is disposed within the cavity 94. A generally planar and circular plate member 96 is disposed adjacent the flange 72 of the small pulley member 70. The small pulley member 70 and plate member 96 are secured within the cavity 94 by a flange 98 at the free end of the side wall 90 which extends radially inwardly and has an inclined or beveled surface 99. It should be appreciated that the small pulley member 70 is sandwiched between the plate member 96 and bottom wall 92 such that the small pulley member 70 is free to rotate within the cavity 94. It should also be appreciated that the bottom wall 92, side wall 90 and flange 98 are preferably integral. It should further be appreciated that the small pulley member 70 has a diameter less than the large pulley member 24.

The plate member 96 and bottom wall 92 each include a generally circular aperture 100 and 102 extending therethrough and generally concentrically aligned with the aperture 82 of the bushing 80. The housing 88 also includes a generally circular and tubular extension 104 extending radially outwardly from the side wall 90. An aperture 106 extends through the housing 88 and communicates with the cavity 94 and an interior 107 of the tubular extension 104. The other end of the conduit 22 is adapted to be disposed within the interior 107 of the tubular extension 104. It should be appreciated that the conduit 22 is secured within the tubular extension 104.

The conduit 22 is generally circular in cross-sectional shape and extends longitudinally. The conduit 22 includes a pair of transversely spaced and longitudinally extending passageways 108 and 110 throughout the length thereof. A pair of strands 112 and 114 such as of metal wire are disposed within the passageways 108 and 110, respectively. The strand 112 extends through the passageway 108 and the groove 76 and partially about the small pulley member 70 to a U-shaped recess 116 thereof. The strand 114 extends through the passageway 110 and groove 76 and partially about the small pulley member 70 on the other side thereof to the U-shaped recess 116. Preferably, the strands 112 and 114 are one continuous strand. It should be appreciated that strands 112 and 114 could be two separate strands having their ends staked together and held in place by a metal cylindrical member 118 disposed in the U-shaped recess 116. In the preferred embodiment, the strands 112 and 114 are a continuous strand which extends through an aperture (not shown) in the cylindrical member 118 and compressed or pinched to secure the cylindrical member 118 to the strand. It should also be appreciated that the U-shaped recess 116 and cylindrical member 118 cooperate together to prevent the strands 112 and 114 from slipping or rotating relative to the small pulley member 70. The other end of the strands 112 and 114 extend through the corresponding passageways 108 and 110 and groove 30 and partially about the large pulley member 24. Each of the strands 112 and 114 extend into a slack adjustment mechanism, generally indicated at 120 in the large pulley member 24. The slack adjustment mechanism 120 takes up the slack or adjusts the tension in each of the strands 112 and 114.

The slack adjustment mechanism 120 includes a passageway 122 extending into a generally rectangular channel 124 in the large pulley member 24. The passageway 122 and channel 124 extend inwardly radially at an angle. The channel 124 includes a plurality of teeth 126 which are spaced by grooves 128. The teeth 126 are generally V-shaped and formed in a "christmas tree" pattern. A generally rectangular retainer member 130 has a pair of transversely spaced and longitudinally and outwardly extending tangs 132 which are adapted to engage the grooves 128 between the teeth 126. Each strand 112 and 114 extend through an aperture 134 in one end of the retainer member 130. A generally spherically shaped ball 136 is staked onto the end of each strand 112 and 114 to prevent the strand 112 and 114 from exiting or disengaging the aperture 134 and retainer member 130. A spring 138 is disposed about each strand 112 and 114 between one end of the retainer member 130 and one end of the channel 134. The spring 138 preloads or bias the retainer member 130 toward the opposite end of the channel 134. Preferably, only a portion 139 of the plate member 54 extends partially over the channel 124 to prevent the retainer member 130 from exiting vertically or axially outwardly from the channel 124 while allowing a tool to move the retainer member 130 along the channel 124.

Additionally, the small pulley member 70 may include a plurality of circumferentially spaced teeth 140 which cooperate with a post member 142 to produce a noise such as a "click". It should be appreciated that this feature is optional.

In operation, the strands 112 and 114 are extended through the passageways 108 and 110 of the conduit 22. The strands 112 and 114 are guided in the groove 76 partially around the small pulley member 70. The strands 112 and 114 are secured to the cylindrical member 118 which is disposed in the U-shaped recess 116. The other end of the strands 112 and 114 are guided in groove 30 partially around the large pulley member 24 and into passageways 122. The springs 138 are disposed about the strands 112 and 114. The strands 112 and 114 are extended through aperture 134 in retainer member 130. The ball 136 is then staked to each end of the strands 112 and 114.

The retainer member 130 and spring 138 are disposed at the non-toothed end of the channel 124. A tool such as a screwdriver is used to move the retainer member 130 toward the opposite or toothed end of the channel 124. The tangs 132 are deflected inwardly as they contact the teeth 126 and extend or flex outwardly when disposed in the space 128 between the teeth 126. As the retainer member 130 moves along the channel 124, the slack in the strands 112 and 114 is taken up to extend the strands 112 and 114 and increase the tension in strands 112 and 114. When the strands 112 and 114 are taut, the tangs 132 engage the teeth 126 in the next available or adjacent space 128.

The cylindrical end of shaft member 17 is disposed in aperture 82 of the bushing 80 for the small pulley member 70. The cylindrical end of support member 13 is disposed in aperture 40 of bushing 36 for the large pulley member 24. The knob 16 may be rotated in either direction to rotate the small pulley member 70, which in turn, rotates the large pulley member 24 in the same direction, in turn, rotating vane 12.

Referring to FIG. 4, an alternate embodiment of the cable assembly 14 is shown. Like parts have like numerals increased by two hundred (200). The slack adjustment mechanism 320 of the large pulley member 224 includes a pair of transversely spaced and generally parallel arms 350 which are separated on each side by spaces 352 and 354 in the large pulley member 224. The arms 350 are generally T-shaped and are hinged at 356 to the remainder of the large pulley member 224. The free end 357 of the arms 350 and 352 include a channel 358 extending transversely therethrough. The strands 212 and 214 extend through the channels 358 and ball 336 is staked at one end thereof to prevent the strands from exiting or disengaging channels 358. Each arm 350 includes a plurality of teeth 326 spaced by grooves 328 on the outer free end thereof. A transversely extending spring member 360 has C-shaped ends 362 and is disposed in a groove 363 about an extension 364 of the large pulley member 324. The C-shaped ends 362 have an outwardly and inclined extending portion 366 which is adapted to engage a space 328 between the teeth 326.

The operation of the cable assembly 114 is similar to the cable assembly 14. For the slack adjustment mechanism 320, a tool such as a screwdriver is used to move the arms 350 toward each other such that the portion 366 contacts the teeth 326 and is deflected inwardly and extends or flexes outwardly in a space 328 as the arms 350 move toward each other, the slack in the strands 312 and 314 is taken up to extend the strands 312 and 314 and increase the tension in the strands 312 and 314. When the strands 312 and 314 are taut, the projections 366 engage the teeth 326 in the next available or adjacent space 329.

Accordingly, the torque or angular travel may be varied by changing the diameter of the pulleys. Also, the strands are in tension only, eliminating any push-pull operation or compression on the strands. Further, the slack in the strands may be taken up in several ways.

The present invention has been described in an illustrative manner. It is to be understood that the terminology which has been used is intended to be in the nature of words of description rather than of limitation.

Many modifications, variations of the present invention are possible in light of the above teaching. Therefore, within the scope of the appended claims, the present invention may be practiced otherwise and as specifically described.

What is claimed is:

1. A cable assembly for rotating a member in response to a rotating input, comprising:
   first and second pulley means;
   conduit means extending longitudinally and interconnecting said first and second pulley means;
   strand means extending longitudinally through said conduit means and about said second pulley means, said strand means having a pair of ends extending at least partially about said first pulley means; and
   said first pulley means including slack adjustment means attached to said ends of said strand means for adjusting slack in said strand means.

2. A cable assembly as set forth in claim 1 wherein said first pulley means comprises a first housing and a first pulley member rotatably secured within said first housing.

3. A cable assembly as set forth in claim 2 wherein said second pulley means comprises a second housing and a second pulley member rotatably secured within said second housing.

4. A cable assembly as set forth in claim 3 wherein said conduit means comprises a conduit having a pair of spaced passageways extending longitudinally therethrough and said strand means disposed in said passageways.

5. A cable assembly as set forth in claim 4 wherein said strand means has a first and second end, said first end extending through said second housing and partially about said second pulley member and including securing means for securing said first end to said second pulley member.

6. A cable assembly as set forth in claim 5 wherein said second end of said strand means extends through said first housing and partially about said first pulley member and operatively cooperates with said slack adjustment means.

7. A cable assembly as set forth in claim 6 wherein said first pulley member includes a pair of transversely spaced arms having a first end hinged to a remainder of said first pulley member and a second end extending longitudinally.

8. A cable assembly as set forth in claim 7 wherein said slack adjustment means comprises a channel extending transversely through said second end of said arms, said first end of said strand extending through said channel, means for securing said first end of said strand to said arm, a plurality of spaced teeth extending along said second end of said arm, and a spring member secured to said first pulley member and having a projection to cooperate with said teeth.

9. A cable assembly for rotating a member in response to a rotating input, comprising:
   first and second pulley means;
   conduit means extending longitudinally and interconnecting said first and second pulley means;
   strand means extending longitudinally through said conduit means and about said first and second pulley means;
   said first pulley means including slack adjustment means for adjusting slack in said strand means;

said first pulley means comprising a first housing and a first pulley member rotatably secured within said first housing;

said second pulley means comprising a second housing and a second pulley member rotatably secured within said second housing;

said conduit means comprising a conduit having a pair of spaced passageways extending longitudinally therethrough and said strand means being disposed in said passageways;

said strand means having a first and second end, said first end extending through said second housing and partially about said second pulley member and including securing means for securing said first end to said second pulley member, said second end of said strand means extending through said first housing and partially about said first pulley member and operatively cooperating with said slack adjustment means; and said slack adjustment means comprising a channel having a plurality of spaced teeth, a retainer member disposed in said channel and having a pair of transversely spaced tangs to cooperate with said teeth, and including means secured to said second end of said strand means to prevent said retainer member from exiting said strand means.

10. A cable assembly as set forth in claim 9 wherein said slack adjustment means includes a spring disposed about said strand means between said retainer member and one end of said channel to bias said retainer member toward an opposite end of said channel.

11. A cable assembly for rotating a member in response to a rotating input, comprising:
first and second pulleys;
a conduit extending longitudinally and interconnecting said first and second pulleys;
a pair of strands extending longitudinally through said conduit and at least partially about said first and second pulleys;
each strand of said pair of strands having a first and second end, said first end extending through said conduit and partially about said second pulley;
securing means for securing said first end to said second pulley;
said second end extending through said conduit and partially about said first pulley; and
said first pulley including slack adjustment means attached to said strands for individually and selectively adjusting slack in each strand of said pair of strands.

12. A cable assembly as set forth in claim 11 wherein said first pulley member includes a pair of transversely spaced arms having a first end hinged to a remainder of said first pulley member and a second end extending longitudinally.

13. A cable assembly as set forth in claim 12 wherein said slack adjustment means comprises a channel extending transversely through said second end of said arms, said first end of said strand extending through said channel, means for securing said first end of said strand to said arm, a plurality of spaced teeth extending along said second end of said arm, and a spring member secured to said first pulley member and having a projection to cooperate with said teeth.

14. A cable assembly for rotating a member in response to a rotating input, comprising:
first and second pulleys;
a conduit extending longitudinally and interconnecting said first and second pulleys;
a pair of strands extending longitudinally through said conduit and at least partially about said first and second pulleys;
each strand of said pair of strands having a first and second end, said first end extending through said conduit and partially about said second pulley;
securing means for securing said first end to said second pulley;
said second end extending through said conduit and partially about said first pulley;
said first pulley including slack adjustment means for adjusting slack in each strand of said pair of strands; and
said slack adjustment means comprising a pair of channels each having a plurality of spaced teeth, a retainer member disposed in each of said channels and having a pair of transversely spaced tangs to cooperate with said teeth, and means for securing said second end to said retainer member.

15. A cable assembly as set forth in claim 14 wherein said slack adjustment means includes a spring disposed about said strand between said retainer member and one end of said channel to bias said retainer member toward an opposite end of said channel.

16. A cable assembly for rotating a vane in response to a rotating input, comprising:
a first housing and a first pulley member rotatably secured within said first housing;
a second housing and a second pulley member rotatably secured within said second housing;
a conduit extending longitudinally and interconnecting said first and second housings;
a pair of strands extending longitudinally through said conduit and at least partially about said first and second pulley member;
said conduit having a pair of spaced passageways extending longitudinally therethrough and said pair of strands disposed in said passageways;
each of said pair of strands having a first and second end, said first end extending through said second housing and partially about said second pulley member and including securing means for securing said first end to said second pulley member and said second end extending through said first housing and partially about said first pulley member;
said first pulley member including slack adjustment means for adjusting slack in each of said pair of strands;
said slack adjustment means comprising a pair of channels each having a plurality of spaced teeth, a retainer member disposed in each of said channels and having a pair of transversely spaced tangs to cooperate with said teeth, and means secured to said second end of said strand to prevent said retainer member from exiting said strand; and
said slack adjustment means including a spring disposed about each of said strands between said retainer member and one end of said channel to bias said retainer member toward an opposite end of said channel.

17. A cable assembly for rotating a member in response to a rotating input, comprising:
a first housing and a first pulley member rotatably secured within said first housing;
a second housing and a second pulley member rotatably secured within said second housing;

a conduit extending longitudinally and interconnecting said first and second housings;

strand means extending longitudinally through said conduit means and at least partially about said first and second pulley means;

said conduit having a pair of spaced passageways extending longitudinally therethrough and a pair of strands disposed in said passageways;

each of said pair of strands having a first and second end, said first end extending through said second housing and partially about said second pulley member and including securing means for securing said first end to said second pulley member and said second end extending through said first housing and partially about said first pulley member;

said first pulley member including slack adjustment means for adjusting the slack in said strand means;

said first pulley member including a pair of transversely spaced arms having a first end hinged to a remainder of said first pulley member and a second end extending longitudinally; and said slack adjustment means comprises a channel extending transversely through said second end of said arms, said first end of said strand extending through said channel, means for securing said first end of said strand to said arm, a plurality of spaced teeth extending along said second end of said arm, and a spring member secured to said first pulley member and having a projection to cooperate with said teeth.

18. A cable assembly for rotating a member in response to a rotating input, comprising:

first and second pulley means;

conduit means extending longitudinally and interconnecting said first and second pulley means;

strand means extending longitudinally through said conduit means at least partially about said second pulley means, said strand means having a pair of ends extending at least partially about said first pulley means;

said first pulley means including slack adjustment means for selectively adjusting slack in each of said ends of said strand means;

said first pulley means comprising a first housing and a first pulley member rotatably secured within said first housing;

said second pulley means comprising a second housing and a second pulley member rotatably secured within said second housing; and means for producing a noise as said second pulley member is rotated, said noise means comprising a plurality of teeth formed circumferentially about said second pulley member and at least one member extending from said second housing to cooperate with said teeth to produce a noise.

19. A cable assembly for rotating a member in response to a rotating input, comprising:

first and second pulleys;

a conduit extending longitudinally and interconnecting said first and second pulleys;

a pair of strands extending longitudinally through said conduit and at least partially about said first and second pulleys;

each of said pair of strands having a first and second end, said first end extending through said conduit and partially about said second pulley;

securing means for securing said first end of said pair of strands to said second pulley;

said second end of said pair of strands extending through said conduit and partially about said first pulley;

said first pulley including slack adjustment means attached to said ends of said strands for individually and selectively adjusting slack in each of said pair of strands; and means for producing a noise as said second pulley is rotated.

20. A cable assembly as set forth in claim 19 wherein said noise means comprises a plurality of teeth formed circumferentially about second pulley and at least one member extending from said conduit to cooperate with said teeth to produce a noise.

21. A cable assembly for rotating a member in response to a rotating input, comprising:

first and second pulley means;

conduit means extending longitudinally and interconnecting said first and second pulley means;

strand means extending longitudinally through said conduit means and about said second pulley means, said strand means having a pair of ends extending at least partially about said first pulley means; and said first pulley means including at least one channel and slack adjustment means disposed in said channel and attached to said ends of said strand means for adjusting slack in each of said ends of said strand means.

22. A cable assembly for rotating a member in response to a rotating input, comprising:

first and second pulley means;

conduit means extending longitudinally and interconnecting said first and second pulley means;

strand means extending longitudinally through said conduit means and about said second pulley means, said strand means having a pair of ends extending at least partially about said first pulley means; and said first pulley means including at least one channel, slack adjustment means disposed in said channel for selectively adjusting slack in each of said ends of said strand means and including spring means cooperating with each of said ends of said strand means for urging said ends toward one end of said channel.

* * * * *